(12) United States Patent
Hong

(10) Patent No.: US 7,349,036 B2
(45) Date of Patent: Mar. 25, 2008

(54) LIQUID CRYSTAL DISPLAY STORAGE DEVICE AND METHOD OF FABRICATING THE SAME

(75) Inventor: Hyung-Ki Hong, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 38 days.

(21) Appl. No.: 10/207,198

(22) Filed: Jul. 30, 2002

(65) Prior Publication Data

US 2003/0020860 A1 Jan. 30, 2003

(30) Foreign Application Priority Data

Jul. 30, 2001 (KR) .............................. 2001-45896

(51) Int. Cl.
*G02F 1/1343* (2006.01)

(52) U.S. Cl. ......................................... 349/39; 349/38

(58) Field of Classification Search .................. 349/38, 349/39, 42, 46, 139
See application file for complete search history.

(56) References Cited

U.S. PATENT DOCUMENTS

| 5,822,027 | A | * | 10/1998 | Shimada et al. | ............... | 349/39 |
| 5,955,744 | A | * | 9/1999 | Gu et al. | .................... | 257/59 |
| 6,016,174 | A | * | 1/2000 | Endo et al. | .................. | 349/43 |
| 6,816,208 | B2 | * | 11/2004 | Fukami et al. | ............... | 349/39 |

* cited by examiner

*Primary Examiner*—Michael H. Caley
(74) *Attorney, Agent, or Firm*—McKenna, Long & Aldridge LLP

(57) ABSTRACT

A liquid crystal display storage device includes a lower electrode extending along a first direction, the lower electrode includes first and second opposing edges, an insulating layer on the lower electrode, and an upper electrode on the insulating layer, wherein a first area of the upper electrode that overlaps the first and second edges of the lower electrode is less than a second area of the upper electrode that extends past the first and second edges of the lower electrode.

12 Claims, 15 Drawing Sheets

LIQUID CRYSTAL DISPLAY STORAGE DEVICE AND METHOD OF FABRICATING THE SAME

The present invention claims the benefit of Korean Patent Application No. 45896/2001 filed in Korea on Jul. 30, 2001, which is hereby incorporated by reference.

BACKGROUND OF THE INVENTION

1. Field of the Invention

The present invention relates to a liquid crystal display device, and more particularly, to a liquid crystal display storage device and a method of fabricating the same.

2. Background of the Related Art

In general, a liquid crystal display (LCD) device displays an image corresponding to data signals that are individually applied to LCD cells arranged in a matrix form. Thus, the LCD cells adjust light transmissivity of each of the LCD cells.

An LCD device includes a liquid crystal panel upon which a plurality of LCD cells constituting pixel units are arranged, thereby forming an active matrix portion and a driver integrated circuit (IC) portion for driving the LCD cells. The LCD device includes a common electrode formed on a first one of opposing inner faces of upper and lower substrates in the liquid crystal panel, pixel electrodes formed on a second one of opposing inner face of the upper and lower substrates so as to confront the common electrode, and a liquid crystal material layer formed between the upper and lower substrates. An electric field is applied to the liquid crystal material layer by providing a potential to the common electrode and the pixel electrodes. Each of the pixel electrodes are disposed at each of the LCD cells formed on the lower substrate, and the common electrode is disposed upon an entire surface of the upper substrate.

A plurality of data lines and a plurality of gate lines are perpendicularly formed on the lower substrate. The plurality of data lines transfer data signals from a data driver IC to corresponding ones of the LCD cells, and the plurality of gate lines transfer scan signals from a gate driver IC to corresponding ones of the LCD cells. Accordingly, each of the LCD cells are defined by an intersection of one of the data lines and one of the gate lines. The gate driver IC sequentially applies the scan signals to the gate lines to sequentially select the gate lines of the LCD cells, and the data driver IC supplies the LCD cells of the selected gate line with one of the corresponding data signals.

A thin film transistor is formed within each of the LCD cells, and functions as a switching device. A conductive channel is formed between source/drain electrodes of the thin film transistor when a gate electrode of the thin film transistor receives the scan signal through a corresponding one of the gate lines.

FIG. 1 is a plan view of an LCD cell of a liquid crystal display according to the conventional art. In FIG. 1, an LCD cell is formed at an intersection between a data line 2 and a gate line 4. The LCD cell includes a thin film transistor TFT and a pixel electrode 14 that is connected to a drain electrode 12 of the thin film transistor TFT. A source electrode 8 of the thin film transistor TFT is connected to the data line 8, a gate electrode 10 of the thin film transistor TFT is connected to the gate line 4, and the drain electrode 12 of the thin film transistor TFT is connected to the pixel electrode 14 through a drain contact hole 16.

The thin film transistor TFT includes an active layer (not shown) for forming a conductive channel between the source electrode 8 and the drain electrode 12 by application of a scan signal to the gate electrode 10 via the gate line 4. As the conductive channel is formed, a data signal transmitted on the data line 2 is supplied to the drain electrode 12 via the source electrode 8. Accordingly, the data signal is transmitted to the pixel electrode 14, and together with a potential applied to the common electrode (not shown), generate an electric field to the liquid crystal material layer (not shown). Once the electric field is applied to the liquid crystal material layer, the liquid crystal molecules rotate by dielectric anisotropy to transmit light emitted from a backlight device toward the upper substrate through the pixel electrode 14. Thus, an amount of the transmitted light is controlled by a voltage value of the data signal.

A storage capacitor 18 includes a storage electrode 20 formed on the gate line 4 to connect to the pixel electrode 14 through a storage contact hole 22. A gate insulating layer (not shown) is formed between the storage electrode 20 and gate line 4 to electrically isolate them from each other. Accordingly, the gate insulating layer is formed during the fabrication process of forming the thin film transistor TFT.

The storage capacitor 18 is charged with a voltage value of the scan signal for an amount of time taken to apply the scan signal to the gate line 4 of a previous LCD cell. Then, the storage capacitor 18 discharges the charged voltage while the voltage value of the data signal is applied to the pixel electrode 14 as the scan signal is applied to the gate line 4 of a next LCD cell. Thus, a voltage variation of the pixel electrode 14 is minimized.

FIGS. 2A to 2G are cross sectional views of a fabrication process of a liquid crystal display along I-I in FIG. 1 according to the conventional art. In FIG. 2A, a metal material, such as Mo, Al, or Cr, is deposited upon a lower substrate 1 by a sputtering process. Then, the metal material is patterned by a photolithographic process to form a gate electrode 10.

In FIG. 2B, an insulating material, such as $SiN_x$, is deposited on an entire surface of the lower substrate 1 including the gate electrode 10, thereby forming a gate insulating layer 30.

In FIG. 2C, an amorphous silicon semiconductor layer 34 is formed on the gate insulating layer 30, and an ohmic contact layer 32 is formed on the semiconductor layer 34. Then, an active layer 36 of a thin film transistor (TFT) is formed by patterning the ohmic contact layer 32 and the semiconductor layer 34.

In FIG. 2D, a metal material is deposited on the gate insulating layer 30 and the ohmic contact layer 32. Then, the metal material is patterned to form a source electrode 8 and a drain electrode 12 of the TFT. In addition, a portion of the semiconductor layer 34 is exposed between the source and drain electrodes 8 and 12.

In FIG. 2E, a passivation layer 38, such as $SiN_x$, is deposited on an entire surface of the gate insulating layer 30, the source and drain electrodes 8 and 12, and the exposed portion of the semiconductor layer 34 by a chemical vapor deposition (CVD) process. In order to improve an aperture ratio of the LCD cell, low dielectric constant organic materials, such as benzocyclobutene (BCB), sin on glass (SOG), and acryl, are commonly used as the passivation layer 38.

In FIG. 2F, a drain contact hole 16 is formed by etching a portion of the passivation layer 38 above the drain electrode 12, thereby exposing a portion of the drain electrode 12.

In FIG. 2G, transparent electrode material is deposited on the passivation layer 38 by a sputtering process, and patterned to form a pixel electrode 14. The pixel electrode 14 is connected to the drain electrode 12 through the drain contact hole 16.

FIGS. 3A to 3D are cross sectional views of the fabrication process of a liquid crystal display along II-II in FIG. 1 according to the conventional art. In FIG. 3A, a gate line 4 is patterned simultaneously with patterning of the gate electrode 10 (in FIG. 2A) upon a lower substrate 1, and a gate insulating layer 30 is formed on the lower substrate 1 including the gate line 4.

In FIG. 3B, a storage electrode 20 is patterned on the gate insulating layer 30 to form an upper electrode of the storage capacitor 18. The patterning of the storage electrode 20 is simultaneously performed with formation of the source and drain electrodes 8 and 12 (in FIG. 2D). A portion of the storage electrode 20 overlaps a portion of the gate line 4 with the gate insulating layer 30 therebetween.

In FIG. 3C, a passivation layer 38 is formed upon the gate insulating layer 30 and the storage electrode 20. Then, a storage contact hole 22 is formed by etching a portion of the passivation layer 38 overlying the storage electrode 20, thereby exposing a portion of the storage electrode 20 through the storage contact hole 22. The passivation layer 38 overlying the storage electrode 20 is formed simultaneously with formation of the passivation layer 38 (in FIG. 2E), and the storage contact hole 22 is formed simultaneously with formation of the drain contact hole 16 (in FIG. 2F).

In FIG. 3D, a pixel electrode 14 is patterned upon the passivation layer 38 to electrically connect to the storage electrode 20 through the storage contact hole 22. The pixel electrode 14 contacting the storage electrode 20 is formed simultaneously with formation of the pixel electrode 14 contacting the drain electrode 12 (in FIG. 2G).

FIG. 4 is a diagram showing an effect of a liquid crystal material layer by application of a DC electric field to a gate line. In general, an AC voltage is applied to the data line 2 and the pixel electrode 14, and a low level DC voltage is uniformly applied to the gate line 4 to drive a unit LCD cell. The low level DC voltage applied continuously to the gate line 4 degrades the liquid crystal characteristics within the unit LCD cell area formed over the gate line 4. In addition, the low level DC voltage adversely influences the driving of the LCD cell, thereby generating unwanted afterimage.

In FIG. 4, a liquid crystal material layer 53 is formed between a lower plate 51 and an upper plate 52 of a liquid crystal display device. Once a DC voltage is applied to a gate line 54 patterned upon the lower plate 51, the liquid crystal material layer 53 disposed over the gate line 54 is adversely influenced by a DC electric field. Accordingly, characteristics of liquid crystal molecules in the liquid crystal material layer 53 are degraded, and driving of a corresponding LCD cell is adversely affected, thereby generating the unwanted afterimage.

FIG. 5 is another diagram showing of an effect of a liquid crystal material layer by application of a DC electric field to another gate line. In FIG. 5, a storage electrode 55 is formed as an upper electrode of a storage capacitor on a gate line 54 patterned on a lower plate 51. Accordingly, most of the DC electric field is concentrated between the gate line 54 and storage electrode 55. Thus, a strength of the DC voltage applied to a liquid crystal material layer 53 is attenuated, thereby preventing degradation of the liquid crystal molecules of the liquid crystal material layer 53.

However, to ensure overlap of the storage electrode 55 with the gate line 54, an area of the storage electrode 55 should be increased, thereby increasing electrical charge capacity and stabilizing a display image. Disadvantageously, the scan signal applied to the gate line 54 becomes delayed.

SUMMARY OF THE INVENTION

Accordingly, the present invention is directed to a liquid crystal display storage device and a method of fabricating the same that substantially obviates one or more problems due to limitations and disadvantages of the related art.

An object of the present invention is to provide a liquid crystal display storage device to prevent degradation of liquid crystal characteristics and driving failure caused by application of a DC electric field of a scan signal applied to a gate line.

Another object of the present invention is to provide a method of fabricating a liquid crystal display storage device to prevent degradation of liquid crystal characteristics and driving failure caused by application of a DC electric field of a scan signal applied to a gate line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display storage device includes a lower electrode extending along a first direction, the lower electrode includes first and second opposing edges, an insulating layer on the lower electrode, and an upper electrode on the insulating layer, wherein a first area of the upper electrode that overlaps the first and second edges of the lower electrode is less than a second area of the upper electrode that extends past the first and second edges of the lower electrode.

In another aspect, liquid crystal display storage device includes a lower electrode on a substrate extending along a horizontal direction, the lower electrode including first and second opposing edges with a central portion therebetween, an insulating layer on the lower electrode, and an upper electrode on the insulating layer and overlapping the lower electrode, wherein a first area of overlap between the upper electrode and the first and second edges of the lower electrode is greater than a second area of overlap between the upper electrode and the lower electrode at the central portion of the lower electrode.

In another aspect, a method of fabricating a liquid crystal display storage device includes forming a lower electrode extending along a first direction, the lower electrode includes first and second opposing edges, forming an insulating layer on the lower electrode, and forming an upper electrode on the insulating layer, wherein a first area of the upper electrode that overlaps the first and second edges of the lower electrode is less than a second area of the upper electrode that extends past the first and second edges of the lower electrode.

In another aspect, a method of fabricating a liquid crystal display storage device includes forming a lower electrode on a substrate extending along a horizontal direction, the lower electrode including first and second opposing edges with a central portion therebetween, forming an insulating layer on the lower electrode, and forming an upper electrode on the insulating layer and overlapping the lower electrode, wherein a first area of overlap between the upper electrode and the first and second edges of the lower electrode is greater than a second area of overlap between the upper electrode and the lower electrode at the central portion of the lower electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
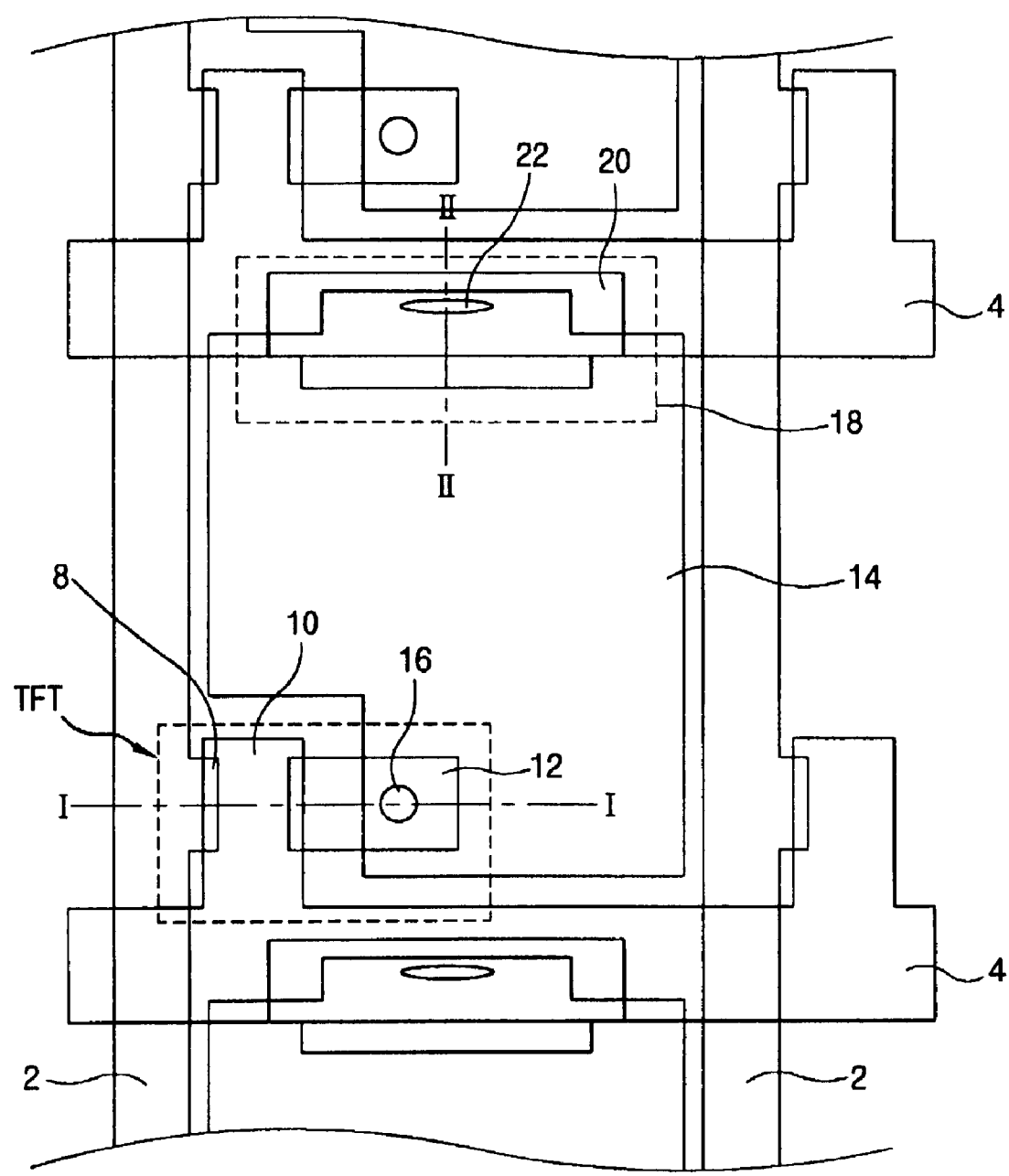
FIG. 1 is a plan view of an LCD cell of a liquid crystal display according to the conventional art.
Figure 2A:
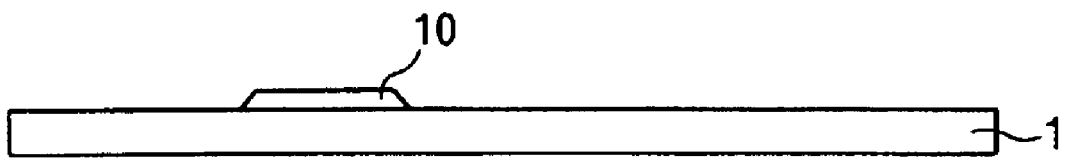
FIGS. 2A to 2G are cross sectional views of a fabrication process of a liquid crystal display along I-I in FIG. 1 according to the conventional art.
Figure 2B:
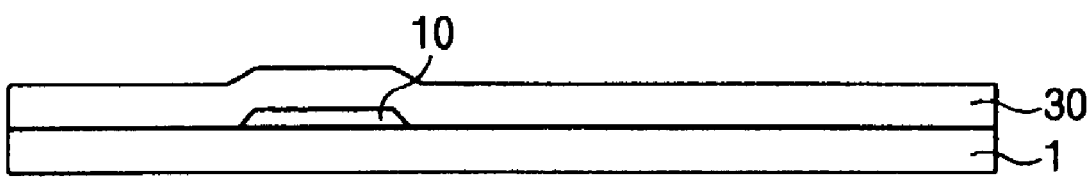
Figure 2C:
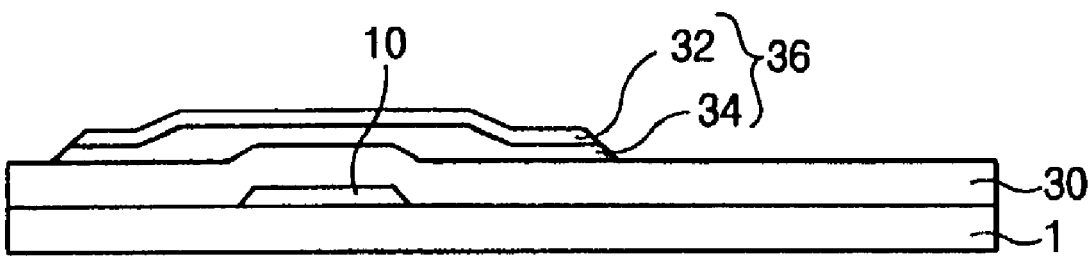
Figure 2D:
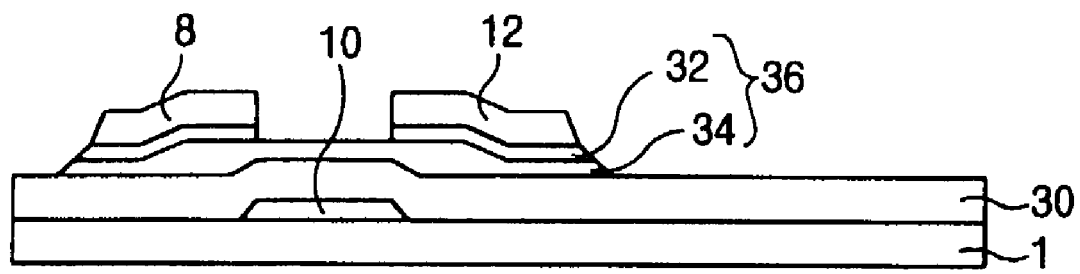
Figure 2E:
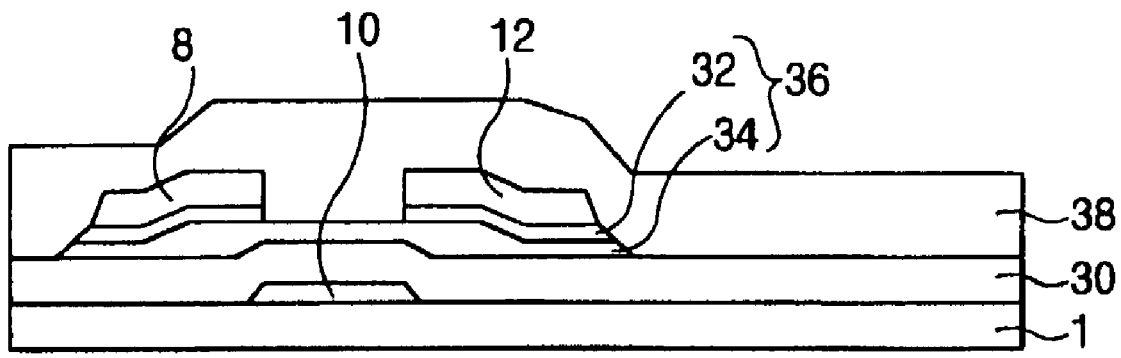
Figure 2F:
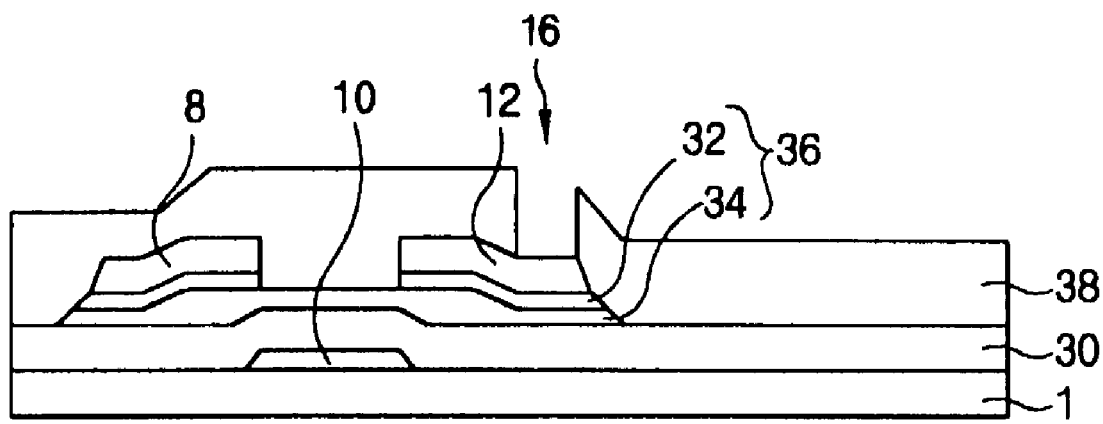
Figure 2G:
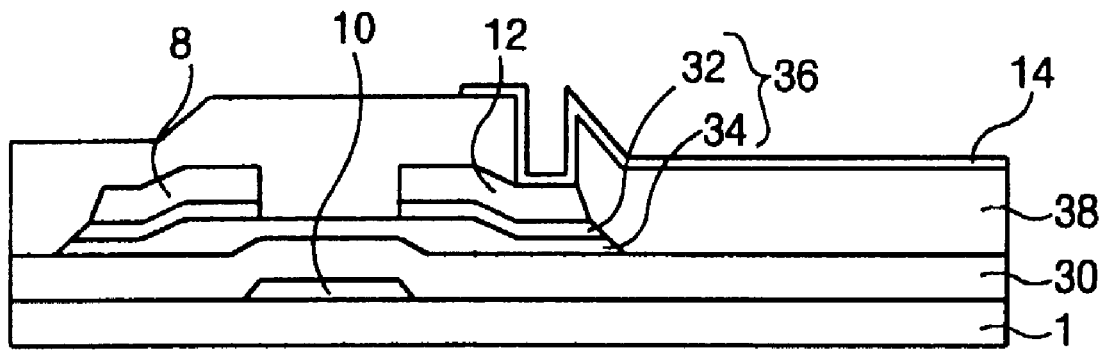
Figure 3A:
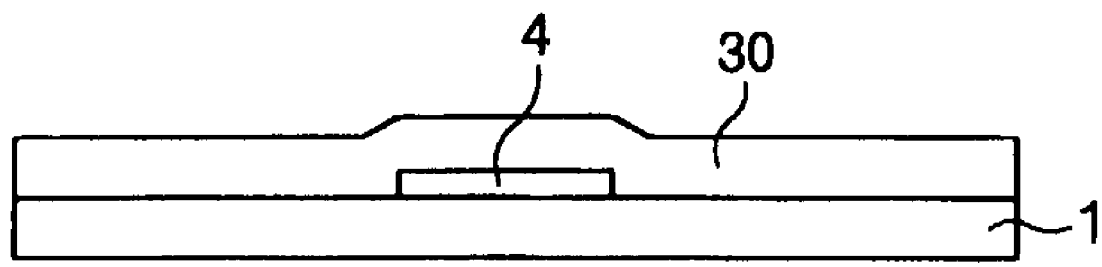
FIGS. 3A to 3D are cross sectional views of the fabrication process of a liquid crystal display along II-II in FIG. 1 according to the conventional art.
Figure 3B:
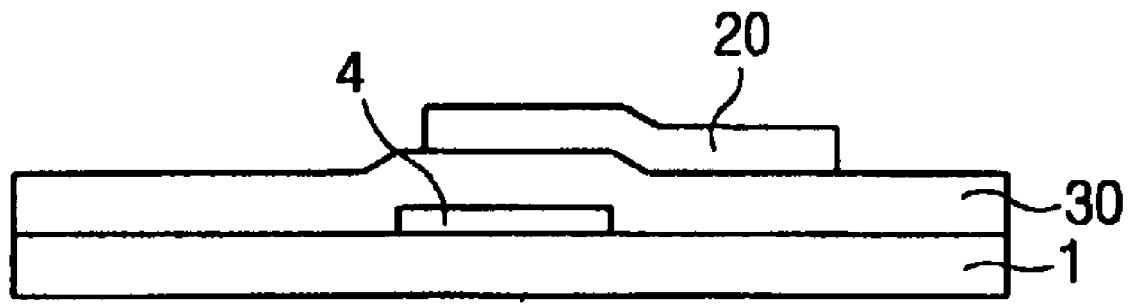
Figure 3C:
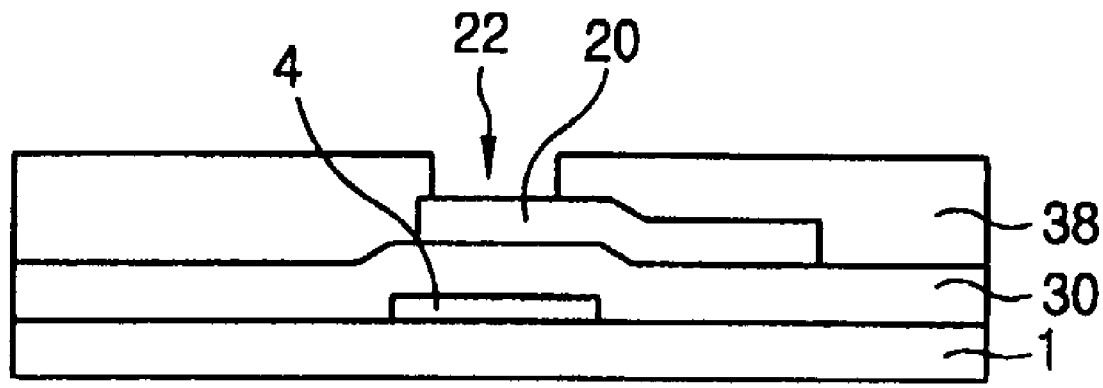
Figure 3D:
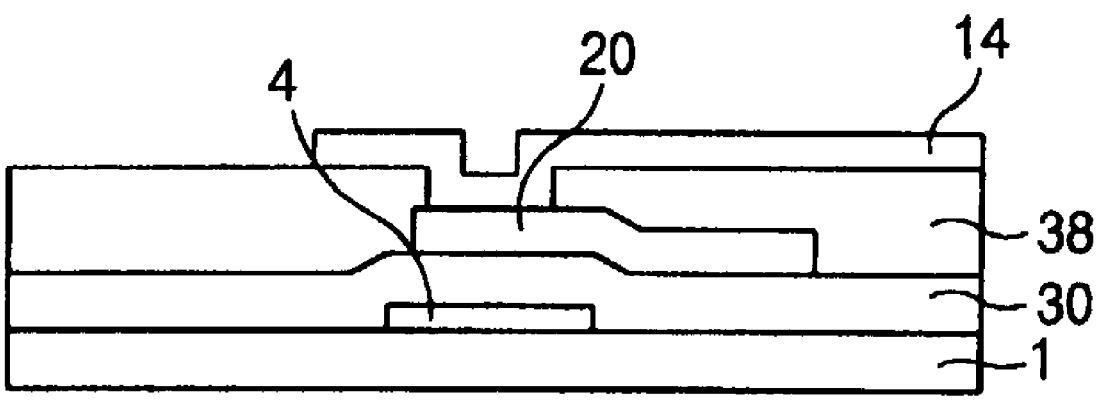
Figure 4:
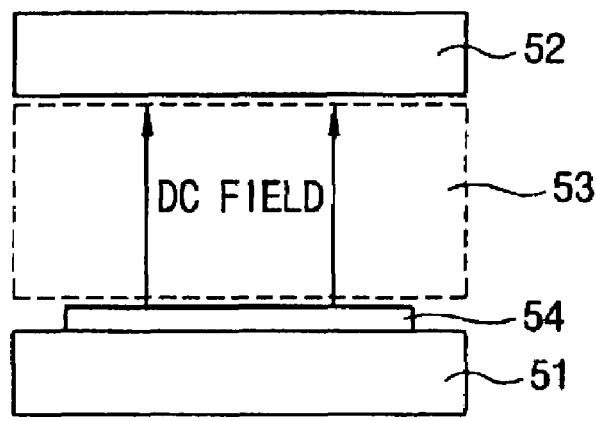
FIG. 4 is a diagram showing an effect of a liquid crystal material layer by application of a DC electric field to a gate line.
Figure 5:
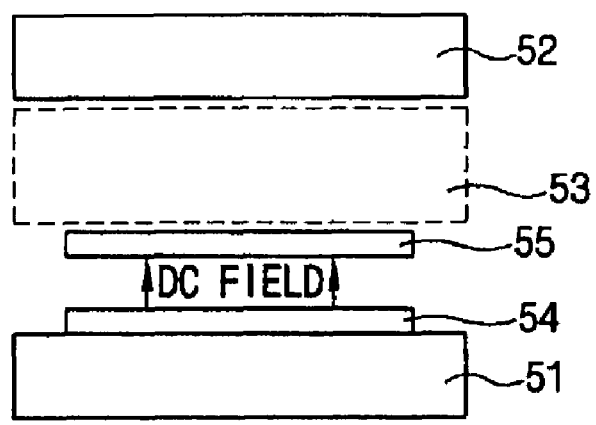
FIG. 5 is another diagram showing of an effect of a liquid crystal material layer by application of a DC electric field to another gate line.
Figure 6:
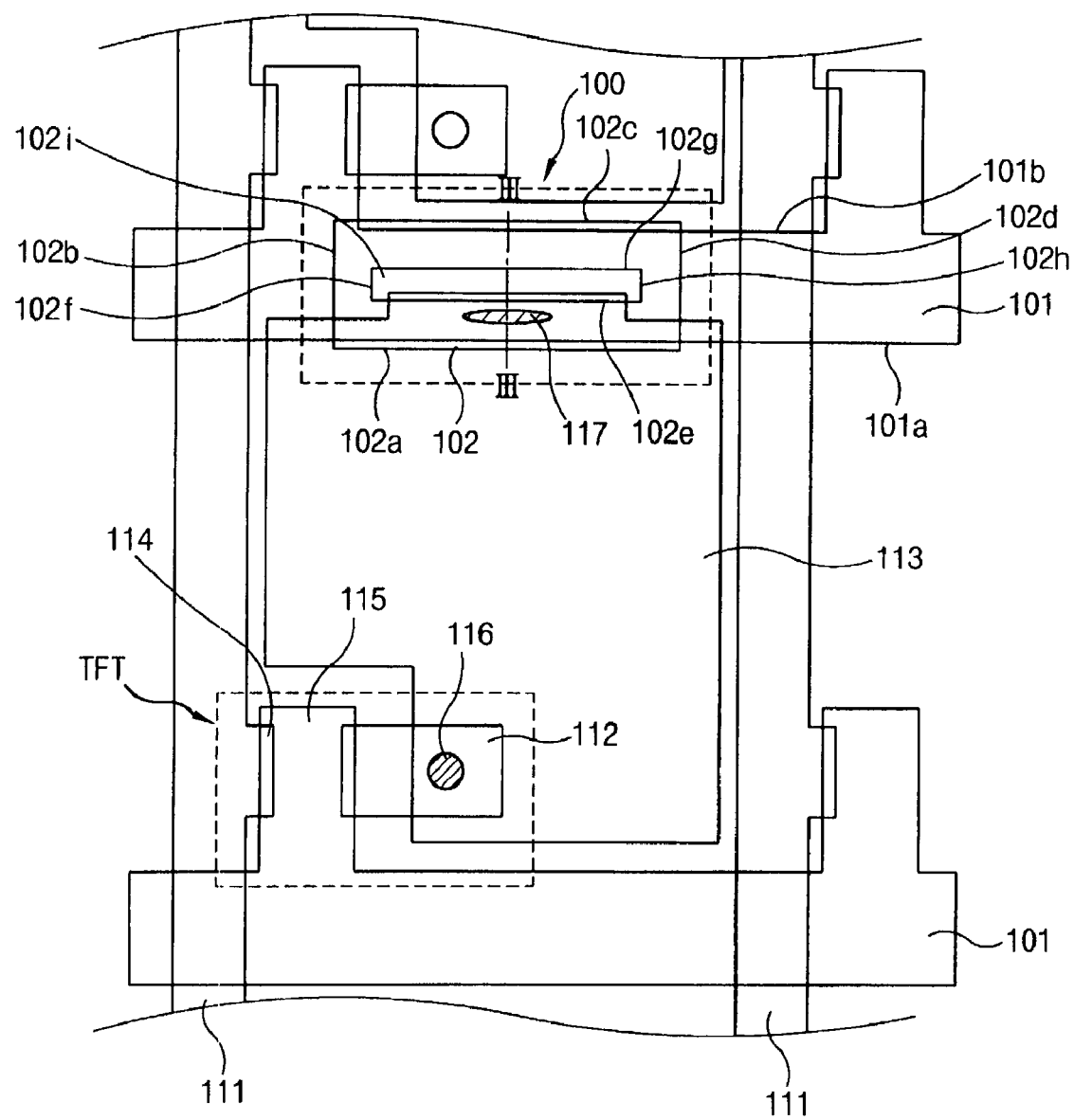
FIG. 6 is a plan view of an exemplary storage capacitor of a liquid crystal display device according to the present invention.

FIG. 6 is a plan view of an exemplary storage capacitor of a liquid crystal display device according to the present invention. In FIG. 6, a liquid crystal display device may include an LCD cell be formed at an intersection between data and gate lines 101 and 111. The LCD cell may include a thin film transistor (TFT) having a drain electrode 113 electrically connected to a pixel electrode 113 via a drain contact hole 116, a source electrode 114 electrically connected to the data line 111, and a gate electrode 115 electrically connected with the gate line 101. The TFT may further include an active layer (not shown) for forming a conductive channel between the source electrode 114 and the drain electrode 112 by application of a scan signal to the gate electrode 115 via the gate line 101.

A storage capacitor 100 may be defined by an area where a storage electrode 102 overlaps a portion of an adjacent gate line 101 with a gate insulating layer (not shown) formed therebetween. The storage electrode 102 may function as an upper electrode of the storage capacitor 100, and the portion of the gate line 101 overlapped by the storage electrode 102 may function as a lower electrode of the storage capacitor 100.

The storage electrode 102 of the storage capacitor 100 may be simultaneously formed by a patterning process during fabrication of the source and drain electrodes 114 and 112, wherein the storage electrode 102 may be connected to the pixel electrode 113 through a storage contact hole 117.

The portion of the storage electrode 102 that may overlap the portion of the gate line 101 may be patterned into a rectangular shape to have a first outermost perimeter 102a and a second outermost perimeter 102c extending along a length direction of the gate line 101, and a third outermost perimeter 102b and a fourth outermost perimeter 102d extending along a width direction of the gate line 101 perpendicular to the length direction. The third and fourth outermost perimeters 102b and 102d may protrude from a first edge 101a of the gate line 101 and a second edge 101b of the gate line 101, respectively, by a predetermined distance. Accordingly, an area of the storage electrode 102 that overlaps the gate line 101 does not increase, thereby preventing a capacitance of the storage capacitor from increasing. Thus, the scan signal that is applied to the gate line 101 is not delayed. Moreover, the DC electric field generated from the first and second edges 101a and 101b of the gate line 111 may be cut off by the third and fourth outermost perimeters 102b and 102d of the storage electrode 102. Thus, portions of a liquid crystal material layer (not shown) disposed at upper and lower ends of the gate line 101 are unaffected by the DC electric field.

The storage electrode 102 may include an opening region 102i centrally formed between the first, second, third, and fourth outermost perimeters 102a, 102b, 102c, and 102d. The opening region 102i may include a rectangular, circular, and curved opening region. In addition, the open region 102i may include a plurality of individual opening regions. Accordingly, in a case where the opening region 102i is rectangular, the storage electrode 102 may have fifth, sixth, seventh, and eighth innermost perimeters 102e, 102f, 102g, and 102h that are each respectively parallel to the first, second, third, and fourth outermost perimeters 102a, 102b, 102c, and 102d. In addition, a portion of the pixel electrode 113 may overlap the fifth innermost perimeter 102e.

Figure 7A:
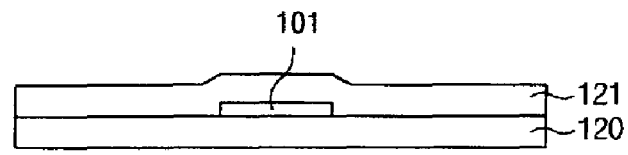
FIGS. 7A to 7D are cross sectional views of an exemplary fabrication process of the storage capacitor along III-III of FIG. 6 according to the present invention.

FIGS. 7A to 7D are cross sectional views of an exemplary fabrication process of the storage capacitor along III-III of FIG. 6 according to the present invention. In FIG. 7A, a gate line 101 may be formed upon a lower substrate 120, and a gate insulating layer 121 may be formed on the gate line 101.

Accordingly, the gate line 101 may be simultaneously patterned during formation of a gate electrode 115 of a TFT (in FIG. 6). Thus, a portion of the gate line 101, which is overlapped with a portion of the storage electrode 102 (in FIG. 6), may function as a lower electrode of the storage capacitor 100 (in FIG. 6).

Figure 7B:
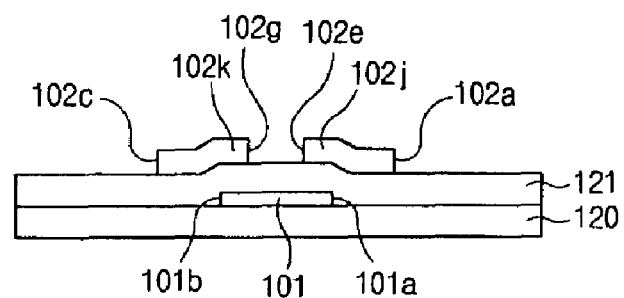

In FIG. 7B, a storage electrode 102 may be formed on the gate insulating layer 121, and patterned into a rectangular shape. Accordingly, the storage electrode 102 may be patterned to include a first portion 102*k* overlapping the first edge 101*a* of the gate line 101, and a second portion 102*j* overlapping the second edge 101*b* of the gate line 101. Thus, the opening region 102*i* of the storage electrode 102 may be disposed over a central portion of the gate line 101. In addition, the storage electrode 102 may be simultaneously patterned during formation of the source and drain electrodes 114 and 112 of the TFT (in FIG. 6).

Figure 7C:
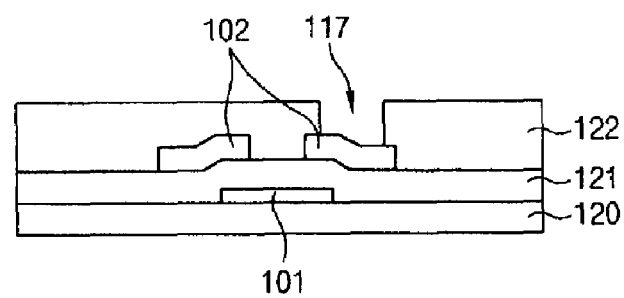

In FIG. 7C, a passivation layer 122 may be formed on the gate insulating layer 121 upon which the storage electrode 102 is formed. A portion of the passivation layer 122 on the storage electrode 102 may be etched to form a storage contact hole 117 exposing a portion of the second portion 102*j* of the storage electrode 102. Accordingly, the passivation layer 122 overlying the storage electrode 102 may be simultaneously formed during formation of the passivation layer 122 overlying an area corresponding to the TFT (in FIG. 6). In addition, the storage contact hole 117 may be simultaneously formed during formation of the drain contact hole 116 (in FIG. 6) of the TFT. Although the storage contact hole is shown in FIG. 6 as having an oval shape, other circular and polygonal geometries may be used.

Figure 7D:
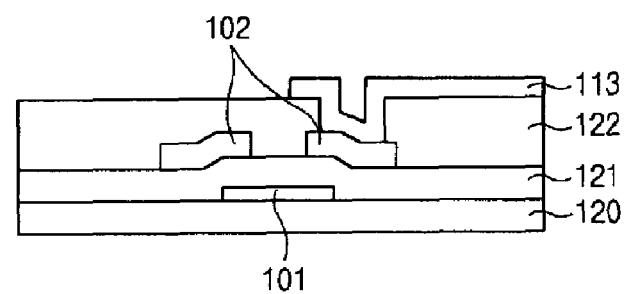

In FIG. 7D, a pixel electrode 113 may be patterned on the passivation layer 122 to be electrically connected to the storage electrode 102 via the storage contact hole 117. Accordingly, the pixel electrode 113 may be simultaneously formed during formation of the pixel electrode 113 (in FIG. 6).

Figure 8:
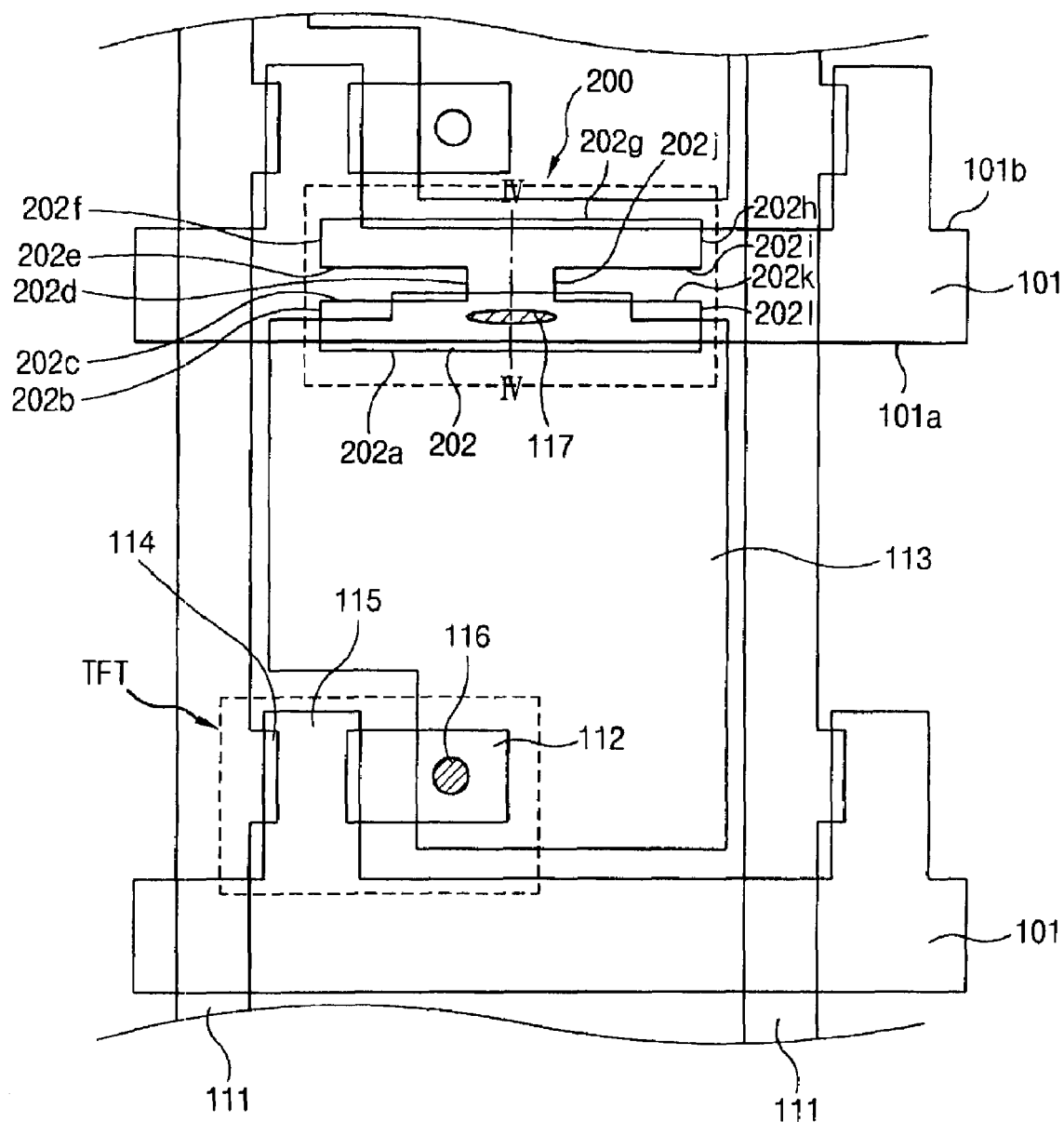
FIG. 8 is a plan view of another exemplary storage capacitor of a liquid crystal display device according to the present invention.

FIG. 8 is a plan view of another exemplary storage capacitor of a liquid crystal display device according to the present invention. Individual elements of FIG. 8, except a storage capacitor 200, may be equivalent to the elements of FIG. 6. Thus, the corresponding explanations are not provided.

In FIG. 8, a storage electrode 202 may be formed simultaneously during formation of the source and drain electrodes 114 and 112 of the TFT, similar to formation of the storage electrode 102 (in FIG. 6). Then, the storage electrode 202 may be patterned in the following manner.

Initially, an area of the storage electrode 202 overlapping the gate line 101 may be patterned to have an area similar to that of the storage electrode 102 (in FIG. 6). The storage electrode 202 may be formed to be "I"-shaped to include a first outer perimeter 202*a*, a second outermost perimeter 202*g*, a first innermost perimeter 202*c*, a second innermost perimeter 202*e*, a third innermost perimeter 202*i*, and a fourth innermost perimeter 202*k* all extending along the length direction of the gate line 101. The storage electrode 202 may further include a third outermost perimeter 202*b*, a fourth outermost perimeter 202*f*, a fifth outermost perimeter 202*h*, a sixth outermost perimeter 202*l*, a fifth innermost perimeter 202*d*, and a sixth innermost perimeter 202*j* all extending along a width direction of the gate line 101. The first outermost perimeter 202*a* may overlap a first edge 101*a* of the gate line 101, the second outermost perimeter 202*g* may overlap a second edge 101*b* of the gate line 101, and the first through sixth innermost perimeters 202*c*, 202*e*, 202*i*, 202*k*, 202*d*, and 202*j* may overlap a central portion of the gate line 101.

Accordingly, the storage electrode 202 may be patterned so that a central portion 202*m* of the storage electrode 202 overlapping a central portion of the gate line 101 is narrower than an overlapping area between the first and second edges 101*a* and 101*b* of the gate line 201 and an area corresponding to the first and second outermost perimeters 202*a* and 202*g* of the storage electrode 202. Thus, an overall area of the storage electrode 202 overlapping the gate line 101 is not increased, thereby capacitance of the storage capacitor does not increase. Hence, the scan signal applied to the gate line 101 is not delayed. Moreover, since the DC electric field generated from boundaries of ends of the gate line 101 is mostly cut off by the storage electrode 202 overlapping a boundary area of the gate line 101 with the gate insulating layer disposed therebetween, a liquid crystal material layer (not shown) at the ends of the gate line 101 is not influenced by the DC electric field.

Figure 9A:
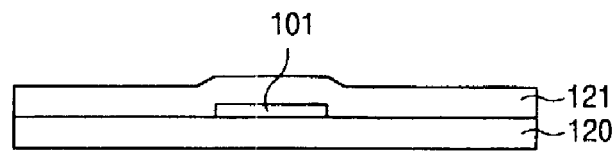
FIGS. 9A to 9D are cross sectional views of another exemplary fabrication process of the storage capacitor along IV-IV of FIG. 8 according to the present invention.

FIGS. 9A to 9D are cross sectional views of another exemplary fabrication process of the storage capacitor along IV-IV of FIG. 8 according to the present invention. In FIG. 9A, a gate line 101 may be formed upon a lower substrate 120, and a gate insulating layer 121 may be formed on the gate line 201. Accordingly, the gate line 01 may be simultaneously patterned during formation of a gate electrode 115 of a TFT (in FIG. 8). Thus, a portion of the gate line 101, which is overlapped with a portion of the storage electrode 202 (in FIG. 8) may function as a lower electrode of the storage capacitor 200 (in FIG. 8).

Figure 9B:
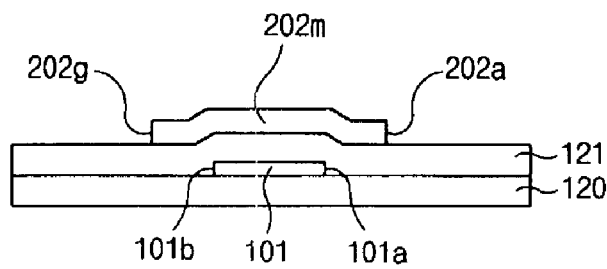

In FIG. 9B, a storage electrode 202 may be formed upon the gate insulating layer 121, and patterned into an I-shape (in FIG. 8). Accordingly, the storage electrode 202 may be patterned to overlap the gate line 101, wherein the central portion 202*m* of the storage electrode 202 is disposed to overlap the central portion of the gate line 101 and the first and second outermost perimeters 202*a* ad 202*g* extend passed the ends of the gate line 101. The storage electrode 202 may be simultaneously patterned during formation of the source and drain electrodes 114 and 112 of the TFT (in FIG. 8).

Figure 9C:
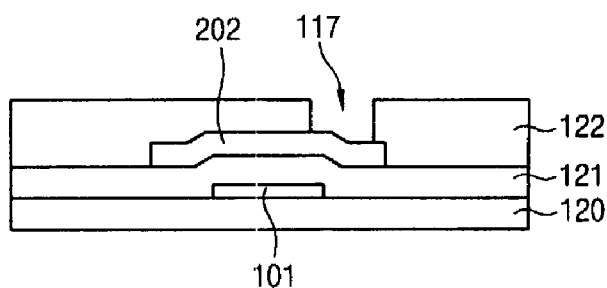

In FIG. 9C, a passivation layer 122 may be formed on the gate insulating layer 121 upon which the storage electrode 202 is formed. A portion of the passivation layer 122 on the storage electrode 202 may be etched to form a storage contact hole 117 exposing a portion of the storage electrode 202. Accordingly, the passivation layer 122 overlying the storage electrode 202 may be simultaneously formed during formation of the passivation layer 122 overlying an area corresponding to the TFT (in FIG. 8). In addition, the storage contact hole 117 may be simultaneously formed during formation of the drain contact hole 116 (in FIG. 8) of the TFT. Although the storage contact hole is shown in FIG. 8 as having an oval shape, other circular and polygonal geometries may be used.

Figure 9D:
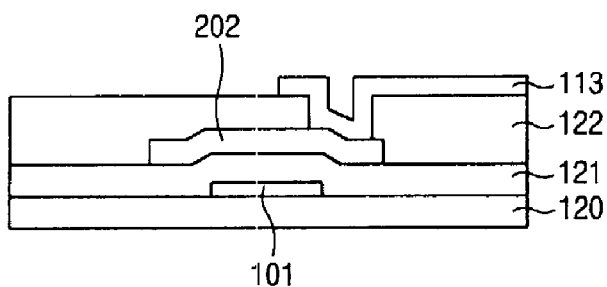

In FIG. 9D, a pixel electrode 113 may be patterned on the passivation layer 122 to be electrically connected to the storage electrode 202 via the storage contact hole 117. Accordingly, the pixel electrode 113 may be simultaneously formed during formation of the pixel electrode 113 (in FIG. 8).

An in-plane switching (IPS) mode LCD device, which drives liquid crystal molecules by a horizontal electric field, enables viewing angles of about 70° along vertical and horizontal viewing directions. In addition, fabrication of the IPS mode LCD device is relatively simpler than fabrication of an LCD device that drives liquid crystal molecules by a vertical electric field. Furthermore, the IPS mode LCD device has less color variance according to viewing angle.

However, in order to generate the horizontal electric field in the IPS mode LCD device, the common and pixel electrodes are patterned on the same substrate. Thus, transmissivity and opening ratio of a backlight device is reduced, driving voltage response time needs to be improved, and a misalignment margin of cell gap is small. Accordingly, LCD devices driving the liquid crystal molecules using vertical and horizontal electric fields are selected in accordance with their suitable usages.

Figure 10:
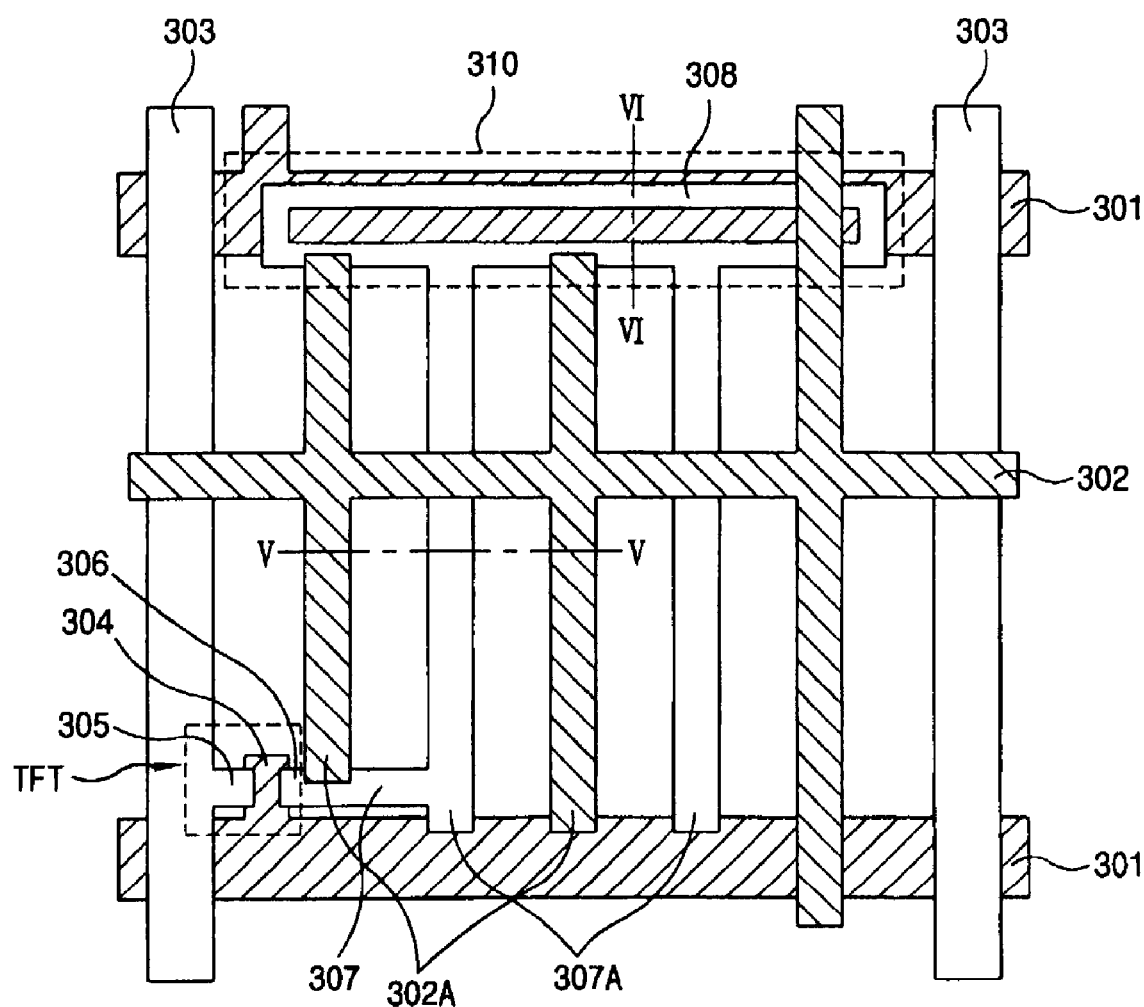
FIG. 10 is a plan view of an exemplary in-plane switching mode liquid crystal display device according to the present invention.

FIG. 10 is a plan view of an exemplary IPS mode LCD device according to the present invention. In FIG. 10, gate and common lines 301 and 302 may be patterned in parallel along a horizontal direction, and data lines 303 may be patterned along a vertical direction to cross with the gate and common lines 301 and 302. Within an area of a thin film transistor (TFT), a gate electrode 304 may be simultaneously formed to extend from one side of the gate line 301 during formation of the gate line 301. A source electrode 305 may be simultaneously formed to extend from one side of the data line 303 during formation of the data line 303 to overlap the gate electrode 304, and a drain electrode 306 may be simultaneously formed to overlap the gate electrode 304. The common line 302 may be patterned along a horizontal direction to include a plurality of common electrodes 302A that extend along a vertical directions, wherein the common electrodes 302A may be formed simultaneously with formation of the common line 302.

A plurality of pixel electrodes 307A may be formed to alternate along the horizontal direction with the common electrodes 302A. Accordingly, the pixel electrode 307A may be electrically connected to the drain electrode 306 via a drawing wire 307. Thus, the pixel electrodes 307A, the drawing wire 307, the data line 303, the source electrode 305, and the drain electrode 306 may be patterned simultaneously.

A storage capacitor 310 may include a lower electrode, an upper electrode overlapped with the lower electrode, and an insulating layer disposed between the lower and upper electrodes. For example, an upper gate line 301 may function as the lower electrode, and a storage electrode 308 overlapping the gate line 301 of the lower electrode may function as the upper electrode. The storage electrode 308 may be patterned simultaneously with formation of the pixel electrode 307A, the drawing wire 307, the data line 303, the source electrode 305, and the drain electrode 306. In addition, a gate insulating layer (not shown) may be formed between the storage electrode 308 and the upper gate line 301.

The storage electrode 308 may be patterned simultaneously when the pixel electrode 307A, and the gate insulating layer (not shown) formed therebetween may be patterned to have a rectangular shape to extend from ends of the uppermost gate line 301 along a length direction of the gate line 301. Moreover, an overlapped area along a horizontal direction of the storage electrode 308 having the rectangular band shape may be patterned to protrude by a predetermined distance toward an exterior (i.e. pixel area) of a lowermost side of the upper gate line 301. Thus, the area of the storage electrode 308 that overlaps the gate line 301 does not increase, thereby preventing the capacitance of the storage capacitor from increasing. Accordingly, the scan signal applied to the uppermost gate line 301 is not delayed. Moreover, since the DC electric field generated from boundaries of the ends of the gate line 301 is mostly cut off by the storage electrode 308 overlapped over the boundary area of the gate line 301 by leaving the gate insulating layer therebetween, a liquid crystal material layer (not shown) at the ends of the gate line 301 is free from the influence of the DC electric field.

Figure 11:
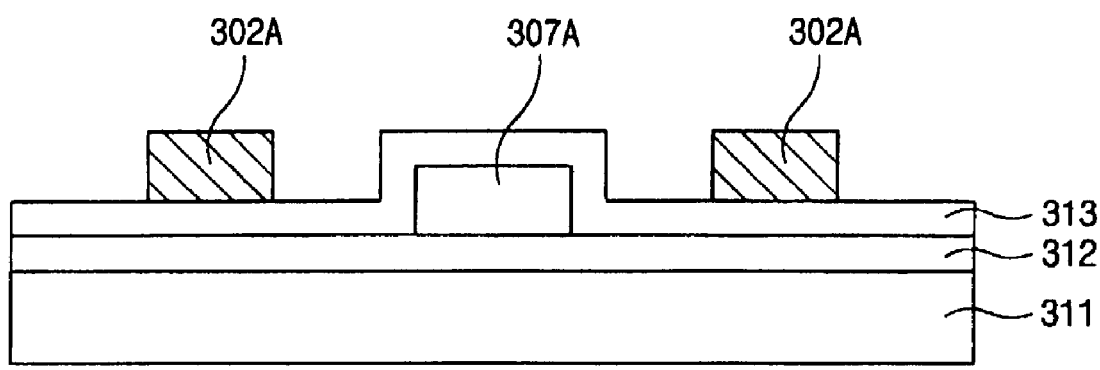
FIG. 11 is a cross sectional view of an exemplary pixel area of the in-plane switching mode LCD device along V-V in FIG. 10 according to the present invention.

FIG. 11 is a cross sectional view of an exemplary pixel area of the IPS mode LCD device along V-V in FIG. 10 according to the present invention. In FIG. 11, a pixel area may include a gate insulating layer 312 formed on an upper surface of a lower substrate 311, a pixel electrode 307A patterned on the gate insulating layer 312, a passivation layer 313 formed on the upper surface of the gate insulating layer including the pixel electrode 307A, and common electrodes 302A patterned on the passivation layer 313 to extend along opposite sides of the pixel electrode 307A.

Figure 12:
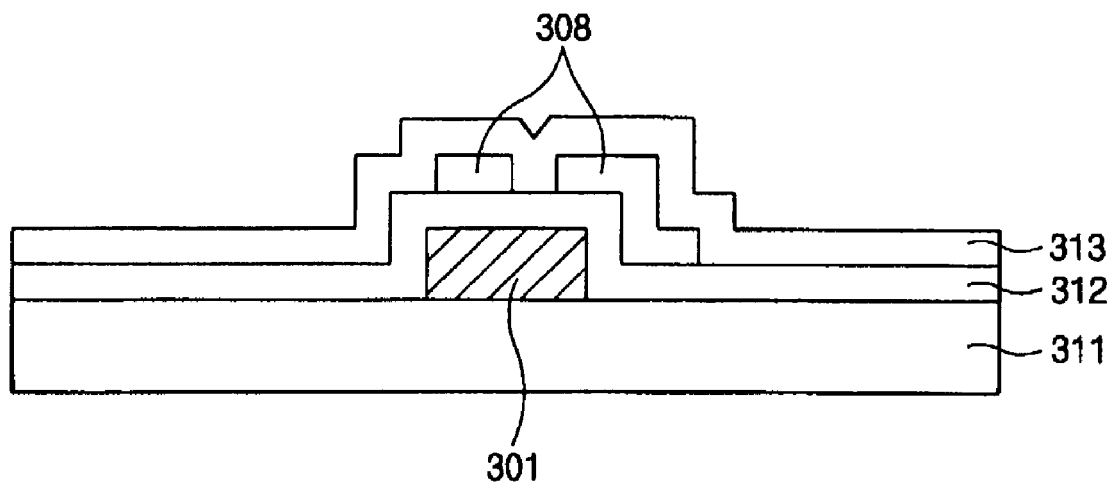
FIG. 12 is a cross sectional view of an exemplary storage capacitor area of the in-plane switching mode liquid crystal display device along VI-VI in FIG. 10 according to the present invention.

FIG. 12 is a cross sectional view of an exemplary storage capacitor area of the in-plane switching mode liquid crystal display device along VI-VI in FIG. 10 according to the present invention. In FIG. 12, a storage capacitor in an IPS mode LCD device may include an upper gate line 301 patterned at an upper part of a lower substrate 311, a gate insulating layer 312 formed on an upper surface of the lower substrate 311 including the upper gate line 301, a storage electrode 308 patterned separately on the gate insulating layer 312, and a passivation layer 313 formed on an upper surface of the resulted structure.

Figure 13:
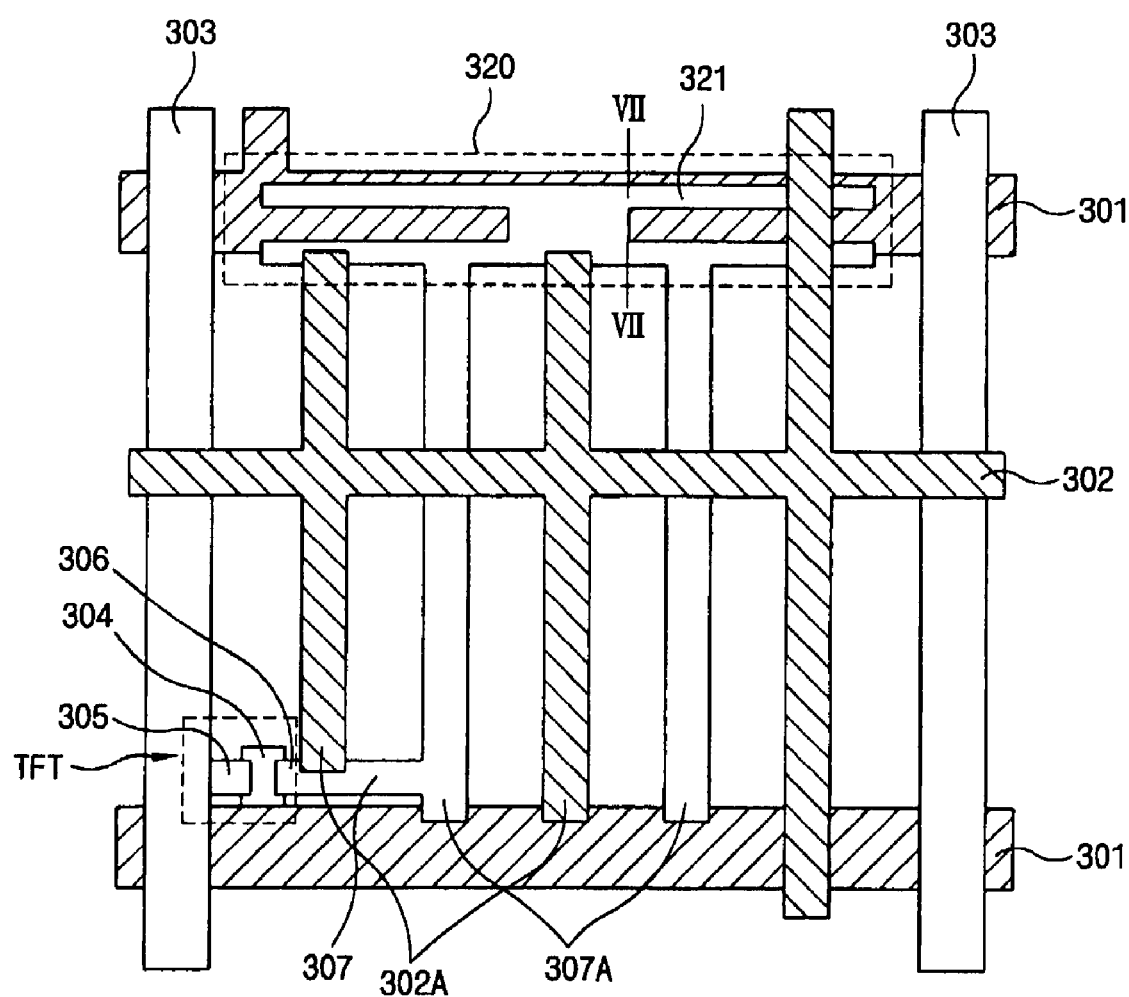
FIG. 13 is a plan view of another exemplary in-plane switching mode liquid crystal display device according to the present invention.

FIG. 13 is a plan view of another exemplary IPS mode LCD device according to the present invention, wherein all the elements except a storage capacitor 320 are similar to FIG. 10. Thus, the corresponding explanation will be omitted.

In FIG. 13, a storage electrode 321 may be simultaneously patterned during formation of a pixel electrode 307A similar to formation of the storage electrode 308 (in FIGS. 10 and 12). The storage electrode 321, which overlaps the upper gate line 301 with a gate insulating layer (not shown) disposed therebetween, may be patterned so that the overlapped area at a central portion of the gate line 301 is narrower than the overlapped area at the ends of the gate line 301. Therefore, the storage electrode 321 extends along a direction of the gate line 301 in a form of an I-shape. Moreover, the overlapped area of the I-shaped storage electrode 321 along a horizontal direction may be patterned to extend by a predetermined distance toward an outside (i.e. pixel area) of a lower end of the uppermost gate line 301. Thus, the area of the storage electrode 321 that overlaps the uppermost gate line 301 does not increase, thereby preventing the capacitance of the storage capacitor from increasing. Accordingly, the scan signal applied to the uppermost gate line 301 is not delayed. Moreover, since the DC electric field generated from a boundary of the lower end of the upper gate line 301 is mostly cut off by the storage electrode 321 overlapped over the boundary area of the gate line 301 by leaving the gate insulating layer therebetween, a liquid crystal material layer (not shown) at the lower end of the gate line 301 is free from the influence of the DC electric field.

Figure 14:
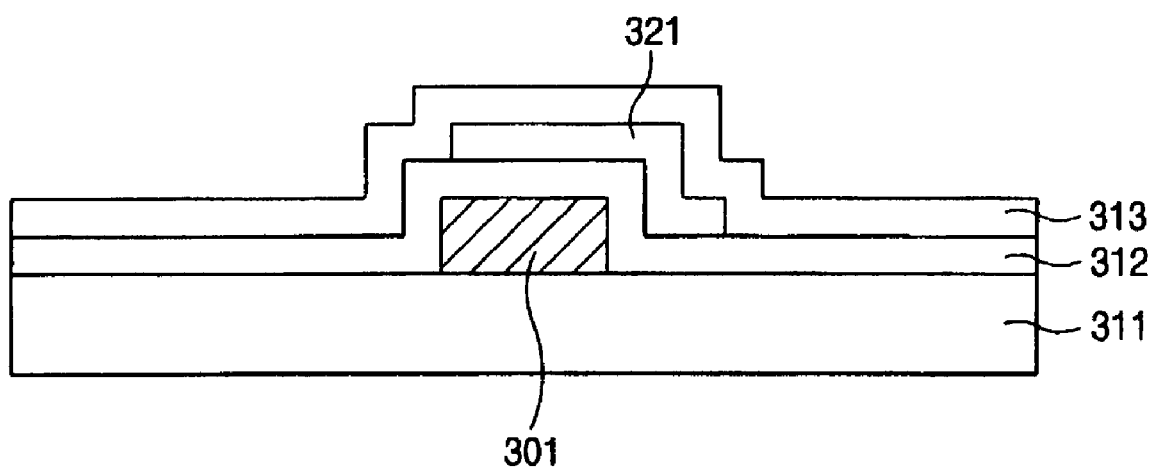
FIG. 14 is a cross sectional view of another exemplary storage capacitor area of the in-plane switching mode liquid crystal display device along VII-VII in FIG. 13 according to the present invention.

FIG. 14 is a cross sectional view of another exemplary storage capacitor area of the IPS mode LCD device along VII-VII in FIG. 13 according to the present invention. In FIG. 14, stacked layers except a storage electrode 321 are the same of those in FIG. 12. The storage electrode 308 (in FIG. 12) may be patterned to be separate over the gate line 301, while the storage electrode 321 may be patterned so as not to be separate over the gate line 301.

It will be apparent to those skilled in the art that various modifications and variations can be made in the liquid crystal display storage device of the present invention without departing from the spirit or scope of the invention. Thus, it is intended that the present invention cover the modifications and variations of this invention provided they come within the appended claims and their equivalents.

What is claimed is:

1. A liquid crystal display device, comprising:
   a first substrate and a second substrate;
   a liquid crystal layer between the first substrate and the second substrate;
   a pixel electrode over the first substrate and a common electrode over the second substrate, the pixel electrode and the common electrode facing each other to apply an electric field to the liquid crystal layer;
   a plurality of lower electrodes extending along a first direction on the first substrate, the lower electrodes include first and second opposing edge regions and a central region;
   an insulating layer on the lower electrodes; and
   a plurality of upper electrodes on the insulating layer to overlap with the lower electrodes to form a first overlapping area at the first and second edge regions in each facing lower electrode and the upper electrode, wherein perimeters of the upper electrodes protrude from the first and second edge regions, a second overlapping area at the central region of the lower electrodes, and a plurality of opening regions exposing the insulation layer over the central region on the lower electrodes,
   wherein the area of the opening regions are the same as each other over the whole lower electrodes.

2. The device according to claim 1, wherein the lower electrodes includes a gate line of a thin film transistor.

3. The device according to claim 1, wherein the insulating layer includes a gate insulating layer of a thin film transistor.

4. The device according to claim 1, further including a passivation layer on the upper electrodes.

5. The device according to claim 4, wherein the upper electrodes are connected to the pixel electrode via a storage contact hole formed in the passivation layer.

6. The device according to claim 1, wherein the upper electrodes include a central portion that covers the insulating layer.

7. The device according to claim 6, wherein the upper electrodes are "I" shaped.

8. A method of fabricating a liquid crystal display device, comprising steps of:
   providing a first substrate and a second substrate;
   introducing a liquid crystal layer between the first substrate and the second substrate;
   forming a pixel electrode over the first substrate and a common electrode over the second substrate, the pixel electrode and the common electrode facing each other to apply an electric field to the liquid crystal layer;
   forming a plurality of lower electrodes extending along a first direction on the first substrate, the lower electrodes include first and second opposing edge regions and a central region;
   forming an insulating layer on the lower electrodes; and
   forming a plurality of upper electrodes on the insulating layer to overlap with the lower electrodes so as to form a first overlapping area at the first and second regions in each facing lower electrode and the upper electrode, wherein perimeters of the upper electrodes protrude from the first and second edge regions, a second overlapping area at the central region of the lower electrodes, and a plurality of opening regions exposing the insulation layer over the central region on the lower electrodes,
   wherein the area of the opening regions are the same as each other over the whole lower electrodes.

9. The method according to claim 8, wherein the step of forming a lower electrodes simultaneously includes forming a gate line and a gate electrode of a thin film transistor.

10. The method according to claim 8, wherein the step of forming an insulating layer simultaneously includes forming a gate insulating layer of a thin film transistor.

11. The method according to claim 8, wherein the step of forming the upper electrodes simultaneously includes forming source and drain electrodes of a thin film transistor.

12. The method according to claim 8, further includes the step of forming a pixel electrode to contact the upper electrodes and a drain electrode of a thin film transistor.

* * * * *